(12) United States Patent
Honda

(10) Patent No.: US 10,554,860 B2
(45) Date of Patent: Feb. 4, 2020

(54) IMAGE FORMING APPARATUS, TEST IMAGE, AND OUTPUT DENSITY ADJUSTMENT METHOD OF IMAGE FORMING APPARATUS

(71) Applicant: TOSHIBA TEC KABUSHIKI KAISHA, Shinagawa-ku, Tokyo (JP)

(72) Inventor: Masashi Honda, Kannami Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/030,110

(22) Filed: Jul. 9, 2018

(65) Prior Publication Data

US 2020/0014821 A1  Jan. 9, 2020

(51) Int. Cl.
H04N 1/60 (2006.01)
(52) U.S. Cl.
CPC ......... *H04N 1/6027* (2013.01); *H04N 1/6025* (2013.01); *H04N 1/6036* (2013.01)
(58) Field of Classification Search
None
See application file for complete search history.

(56) References Cited

U.S. PATENT DOCUMENTS

| | | | | |
|---|---|---|---|---|
| 4,841,337 A * | 6/1989 | Hiratsuka | ............ | H04N 1/4092 347/119 |
| 5,276,459 A * | 1/1994 | Danzuka | ................ | B41J 2/2139 346/33 A |
| 5,566,372 A * | 10/1996 | Ikeda | .................... | H04N 1/4078 358/461 |
| 5,596,353 A * | 1/1997 | Takada | ................... | B41J 29/393 347/14 |
| 5,984,454 A * | 11/1999 | Takahashi | ................ | H04N 1/54 347/43 |
| 6,020,976 A * | 2/2000 | Fujita | ....................... | B41J 3/543 347/3 |
| 6,034,788 A * | 3/2000 | Sasanuma | ............ | H04N 1/4078 358/400 |
| 6,075,614 A * | 6/2000 | Ohtsuka | ............... | H04N 1/4078 347/19 |
| 6,231,155 B1 * | 5/2001 | Udagawa | ............. | B41J 2/17546 347/19 |

(Continued)

FOREIGN PATENT DOCUMENTS

JP          5784289 P          7/2015

*Primary Examiner* — Anh-Vinh T Nguyen
(74) *Attorney, Agent, or Firm* — Foley & Lardner LLP

(57) ABSTRACT

An image forming apparatus includes an image forming unit and a control unit. The image forming unit forms a test image based on test image data. The test image data includes a first image area and a second image area. The first image area is disposed adjacent to the second image area. The first image area is an image area including a mixed color image of a first primary color and a second primary color and has the same gradation value in a main scanning direction. The second image area is an image area of the second primary color and has the same gradation value in the main scanning direction. The control unit corrects a correction table based on the test image formed in the image forming unit. In the correction table, for each primary color, the gradation value is corrected according to a position in the main scanning direction.

20 Claims, 11 Drawing Sheets

(56) References Cited

U.S. PATENT DOCUMENTS

| | | | | |
|---|---|---|---|---|
| 6,418,281 | B1* | 7/2002 | Ohki | G03G 15/5062 |
| | | | | 358/300 |
| 6,439,683 | B1* | 8/2002 | Matsumoto | G06K 15/102 |
| | | | | 347/15 |
| 2003/0128381 | A1* | 7/2003 | Zaima | H04N 1/40025 |
| | | | | 358/1.9 |
| 2004/0086273 | A1* | 5/2004 | Horiuchi | G03D 13/002 |
| | | | | 396/564 |
| 2006/0007465 | A1* | 1/2006 | Hayashi | G06T 5/009 |
| | | | | 358/1.13 |
| 2011/0222869 | A1* | 9/2011 | Sakatani | G03G 15/5062 |
| | | | | 399/15 |
| 2011/0292153 | A1* | 12/2011 | Sadowara | B41J 2/355 |
| | | | | 347/179 |
| 2012/0038957 | A1* | 2/2012 | Umezawa | H04N 1/4078 |
| | | | | 358/504 |
| 2013/0148138 | A1* | 6/2013 | Tanaka | H04N 1/04 |
| | | | | 358/1.9 |
| 2017/0041509 | A1* | 2/2017 | Itagaki | H04N 1/6044 |
| 2017/0054878 | A1* | 2/2017 | Takemura | H04N 1/6033 |

* cited by examiner

IMAGE FORMING APPARATUS, TEST IMAGE, AND OUTPUT DENSITY ADJUSTMENT METHOD OF IMAGE FORMING APPARATUS

FIELD

Embodiments described herein relate generally to an image forming apparatus, a test image, and an output density adjustment method of the image forming apparatus.

BACKGROUND

In related art, an electrophotographic image forming apparatus has variations in mechanism dimensions or electrical characteristics of an image forming unit or the like. For this reason, even if an image with a uniform density is printed, there is a case where an image with a uniform print density may not be obtained due to the variations. Specifically, the variations in mechanism dimensions of the image forming unit or the like cause a density difference from the front to the rear in a main scanning direction.

In order to avoid the occurrence of a density difference, a method of using a correction table may be used. In the case of using the correction table, the image forming apparatus creates a correction table based on the reading result of a formed test image. Further, a service person or the like may adjust the created correction table. In this case, it may be difficult for the service person to appropriately determine the difference in density in the test image.

DETAILED DESCRIPTION

Figure 1:
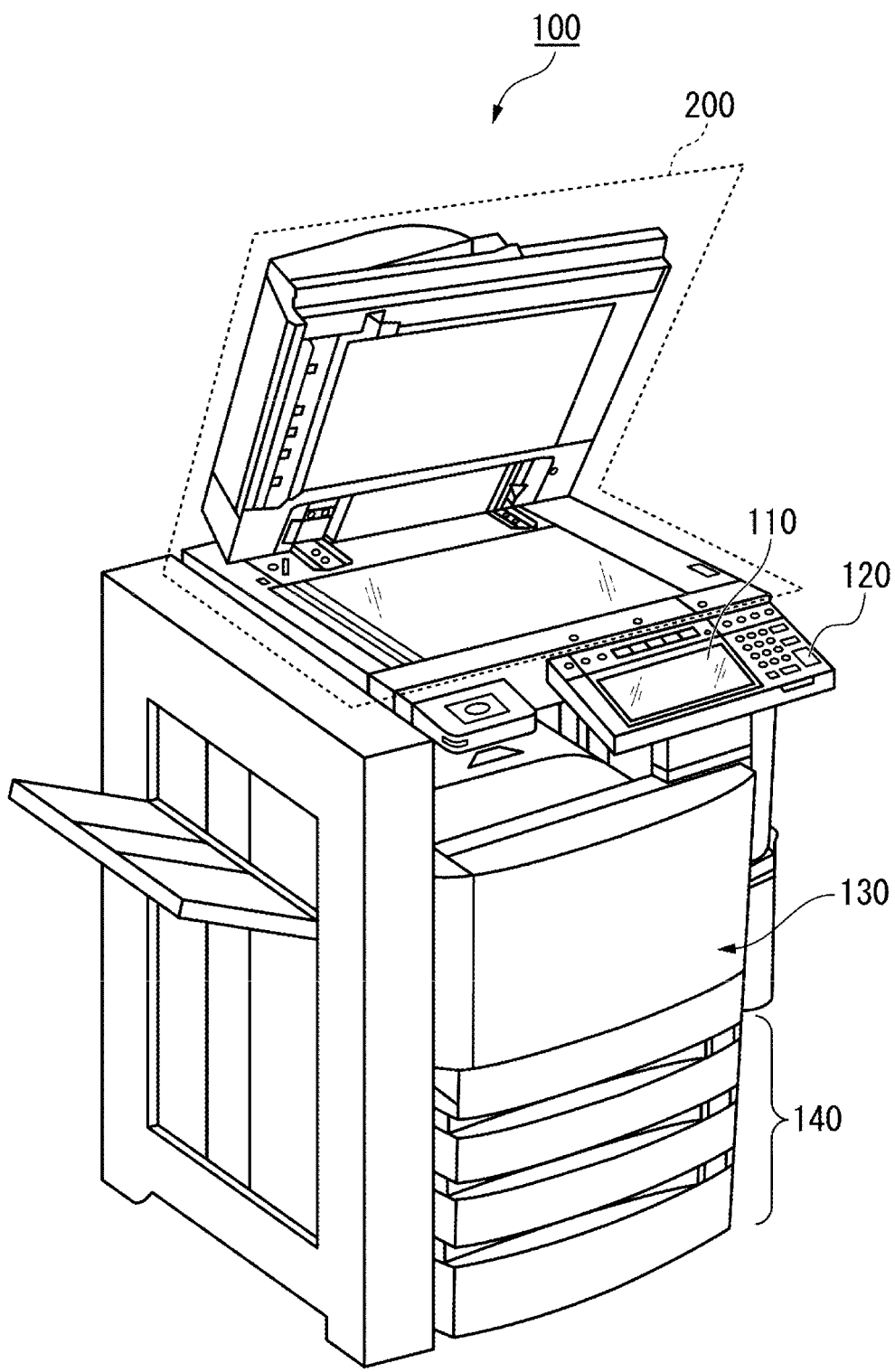
FIG. 1 is an external view showing an overall configuration example of an image forming apparatus according to at least one embodiment.

An image forming apparatus according to at least one embodiment includes an image forming unit and a control unit (controller). The image forming unit forms a test image based on test image data. The test image data includes a first image area and a second image area. In the test image data, the first image area is disposed adjacent to the second image area. The first image area is an image area including a mixed color image of a first primary color and a second primary color and has the same gradation value in a main scanning direction. The second image area is an image area of the second primary color and has the same gradation value in the main scanning direction. The control unit corrects a correction table based on the test image created by the image forming unit. In the correction table, for each primary color, the gradation value is corrected according to a position in the main scanning direction.

Hereinafter, the image forming apparatus of the embodiment will be described with reference to drawings. In the following drawings, the same reference numerals are given to the same components.

FIG. 1 is an external view showing an overall configuration example of an image forming apparatus 100 according to at least one embodiment. The image forming apparatus 100 is, for example, a multi-function peripheral. The image forming apparatus 100 includes a display 110, a control panel 120, a printer unit 130, a sheet storage unit 140, and an image reading unit 200. The printer unit 130 of the image forming apparatus 100 may be a device for fixing a toner image or an ink jet type device.

The image forming apparatus 100 forms an image on a sheet by using a developer such as toner. The sheet is, for example, paper or label paper. The sheet may be anything as long as the image forming apparatus 100 may form an image on the surface thereof.

The display 110 is an image display device such as a liquid crystal display, or an organic electroluminescence (EL) display. The display 110 displays various information on the image forming apparatus 100.

The control panel 120 has a plurality of buttons. The control panel 120 receives a user's operation. The control panel 120 outputs a signal corresponding to the operation performed by the user to the control unit of the image forming apparatus 100. The display 110 and the control panel 120 may be configured as an integral touch panel.

The printer unit 130 forms an image on a sheet based on image information generated by the image reading unit 200 or image information received via a communication path. The printer unit 130 forms an image by the following processing, for example.

The image forming unit of the printer unit 130 forms an electrostatic latent image on a photoconductive drum based on the image information. The image forming unit of the printer unit 130 forms a visible image by attaching a developer such as toner to the electrostatic latent image. The toner includes toner of primary colors such as yellow, magenta, cyan, and black, for example. Hereinafter, yellow is also referred to as "Y". Hereinafter, magenta is also referred to as "M". Hereinafter, cyan is also referred to as "C". Hereinafter, black is also referred to as "B".

A transfer unit of the printer unit 130 transfers the visible image onto the sheet. A fixing unit of the printer unit 130 fixes the visible image on the sheet by heating and pressurizing the sheet. The sheet on which the image is formed by the fixing unit is discharged to the outside of the apparatus from a paper discharge unit.

The sheet storage unit 140 accommodates a sheet used for image formation in the printer unit 130. The sheet on which an image is to be formed may be a sheet stored in the sheet storage unit 140 or may be a sheet set by hand.

The image reading unit 200 reads an image to be read as light and shade of light and converts the image into image information such as RGB values. The image reading unit 200 includes, for example, a scanner lamp, a scanning optical system, a condensing lens, a CCD sensor, and the like. The scanner lamp illuminates the image to be read. The scanning optical system mounts a mirror that changes an optical path of the reflected light from the image to be read. The condensing lens condenses the reflected light from the image to be read and forms an image. The CCD sensor converts the imaged image light into an electric signal.

The image reading unit 200 records the image information of the read image. The recorded image information may be transmitted to another information processing device via the network. An image may be formed on the sheet by the printer unit 130 based on the recorded image information.

Figure 2:
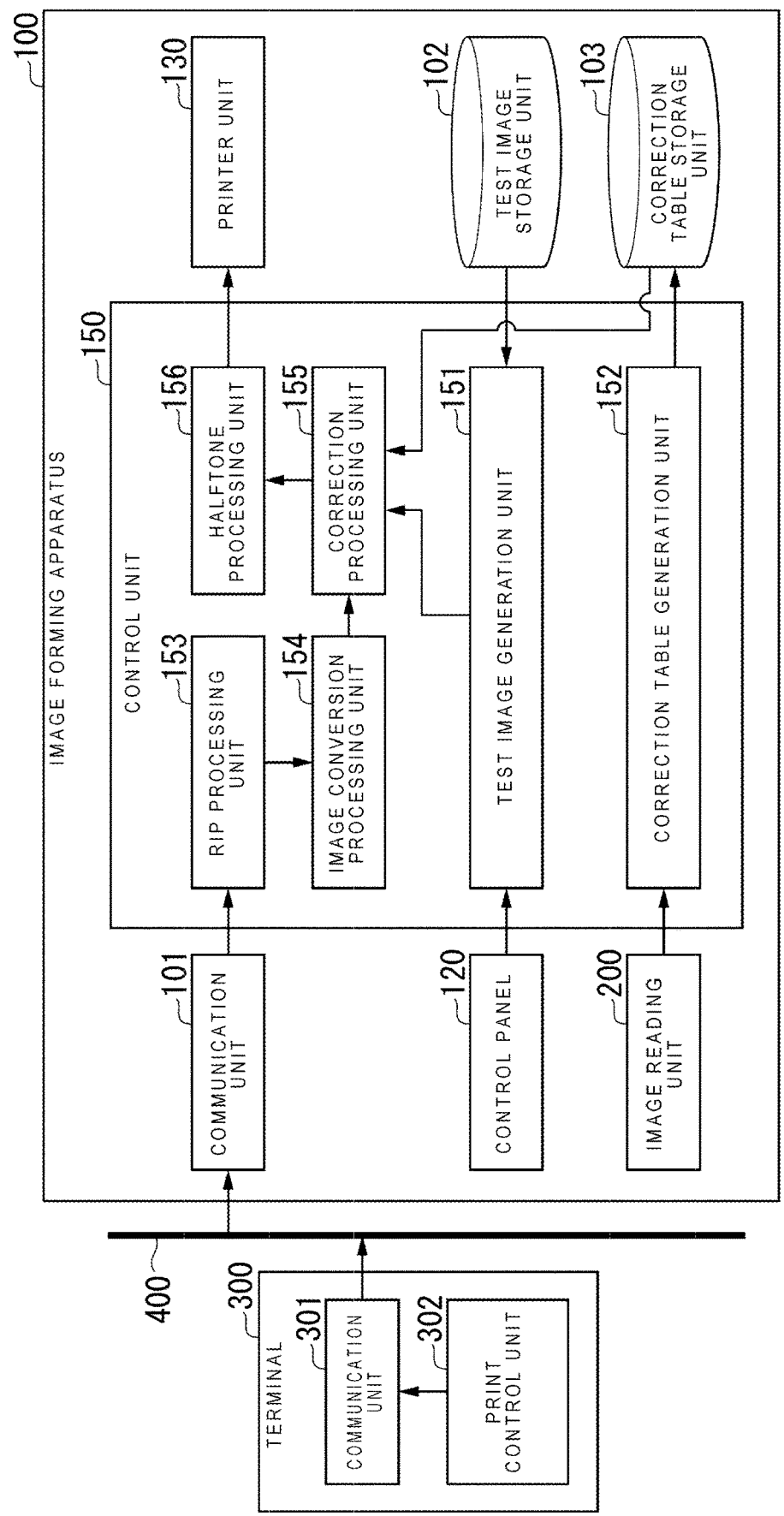
FIG. 2 is a block view showing a configuration of a function of performing in-plane unevenness correction processing in at least one embodiment.

FIG. 2 is a block view showing a configuration of a function of performing in-plane unevenness correction processing in at least one embodiment. In FIG. 2, the same reference numerals are given to the same elements as those of FIG. 1.

The image forming apparatus 100 and a terminal 300 shown in FIG. 2 are connected to each other so as to communicate with each other via a network 400. The network 400 may be constructed by any network. For example, the network 400 may be constructed with a local area network (LAN).

The image forming apparatus 100 includes a communication unit 101, a test image storage unit 102, a correction table storage unit 103, and a control panel 120. In addition, the image forming apparatus 100 further includes the printer unit 130, a control unit 150, and the image reading unit 200.

The communication unit 101 may be a network interface. The communication unit 101 communicates with the terminal 300 via the network 400. The communication unit 101 may communicate by using a communication method such as a local area network (LAN), or Bluetooth (registered trademark).

The test image storage unit 102 may be a storage device such as a magnetic hard disk device, or a semiconductor storage device. The test image storage unit 102 stores test image data. The test image data is data used for forming an image of a test image. Details of the test image will be described later.

Figure 6:
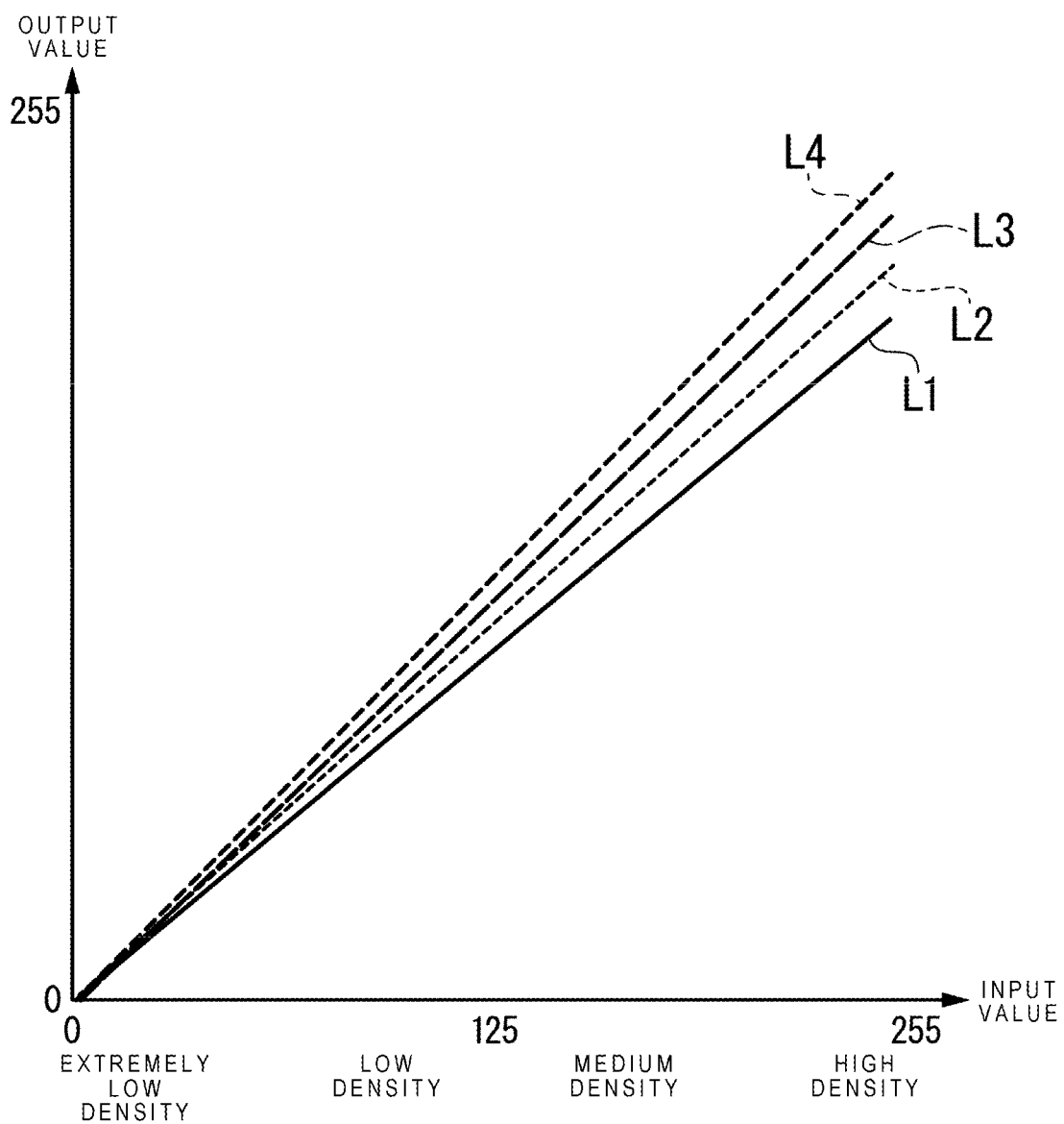
FIG. 6 is a view showing an example of a correction table.

The correction table storage unit 103 may be a storage device such as a magnetic hard disk device, or a semiconductor storage device. The correction table storage unit 103 stores a correction table for each primary color. The correction table is a table for correcting a difference in a toner density (also referred to as in-plane unevenness) occurring in the main scanning direction of the sheet. The correction table has a correspondence relationship between an input value and an output values. The input value and the output value are, for example, gradation values. An example of the correction table is shown in FIG. 6.

The control unit 150 controls the operation of each unit of the image forming apparatus 100. The control unit 150 is executed by a device including, for example, a central processing unit (CPU) and a random access memory (RAM). The control unit 150 includes a test image generation unit 151, a correction table generation unit 152, and a raster image processor (RIP) processing unit 153. In addition, the control unit 150 includes an image conversion processing unit 154, a correction processing unit 155, and a halftone processing unit 156. The control unit 150 realizes the functions of the respective units of the control unit 150 by executing the image forming program stored in the memory or the like.

The test image generation unit 151 generates a test image based on the test image data stored in the test image storage unit 102. The test image generation unit 151 outputs the generated test image to the printer unit 130 to form an image.

The correction table generation unit 152 generates a correction table for correcting in-plane unevenness. The correction table generation unit 152 generates a correction table based on the density characteristics of the test image read by the image reading unit 200. In addition, the correction table generation unit 152 corrects the correction table according to an adjustment instruction of the correction table by the user.

The RIP processing unit 153 converts a print job received from the terminal 300 into image data of raster format. The raster format is an image format for recording colors and density information on a pixel-by-pixel basis. The print job is an image forming command given to the image forming apparatus 100. The print job includes image data to be subjected to image formation.

The RIP processing unit 153 generates attribute information based on the image data. The attribute information is image information included in the image data. The attribute information indicates, for example, an image such as a photograph, a graphic representing a figure such as a circle or a triangle, a text representing a character string, or the like. The RIP processing unit 153 outputs the image data and the attribute information to the image conversion processing unit 154.

The image conversion processing unit 154 performs color conversion processing and filter processing on the image data received from the RIP processing unit 153. The color conversion processing is, for example, processing of adjusting reproducibility of the color and gradation of image data. The filter processing is, for example, processing of applying a smoothing filter or a Gaussian filter. Any method may be used for the color conversion and filter processing. The image conversion processing unit 154 outputs the processed image data to the correction processing unit 155.

The correction processing unit 155 corrects the gradation value (input value) of each pixel of the image data based on the correction table stored in the correction table storage unit 103. The correction processing unit 155 corrects the gradation value of each pixel of the image data based on the correction table and outputs the corrected gradation value as an output value.

The halftone processing unit 156 converts the image data corrected by the correction processing unit 155 into image data printable by the printer unit 130. The halftone processing unit 156 expresses multiple gradations by combining pixel values of a plurality of pixels having a predetermined gradation. The halftone processing unit 156 converts the image data by using, for example, an error diffusion method, a dither method, or an intensity pattern method.

The terminal 300 is configured by using an information processing apparatus such as a mainframe, a workstation, or a personal computer. The terminal 300 includes a CPU, a memory, an auxiliary storage device, and the like connected by a bus. The terminal 300 functions as a device including a communication unit 301 and a print control unit 302 by executing a print data generation program.

All or a part of respective functions of the terminal 300 may be realized by using hardware such as ASICs, PLDs, and FPGAs, for example. The print data generation program may be recorded on a computer-readable recording medium. The computer-readable recording medium is, for example, a storage device such as a flexible disk, a magneto-optical disk, a ROM, or a CD-ROM. In addition, the computer-readable recording medium is, for example, a portable medium such as a semiconductor storage device, or a storage device such as a built-in hard disk or a semiconductor storage device.

The communication unit 301 may be a network interface. The communication unit 301 communicates with the image forming apparatus 100. The communication unit 301 may communicate by a communication method such as LAN, or Bluetooth. The print control unit 302 transmits the print job to the image forming apparatus 100 according to the user's operation. The print control unit 302 is, for example, a printer driver.

Here, correction table generation processing and correction table adjustment processing in the present embodiment will be described.

Figure 3:
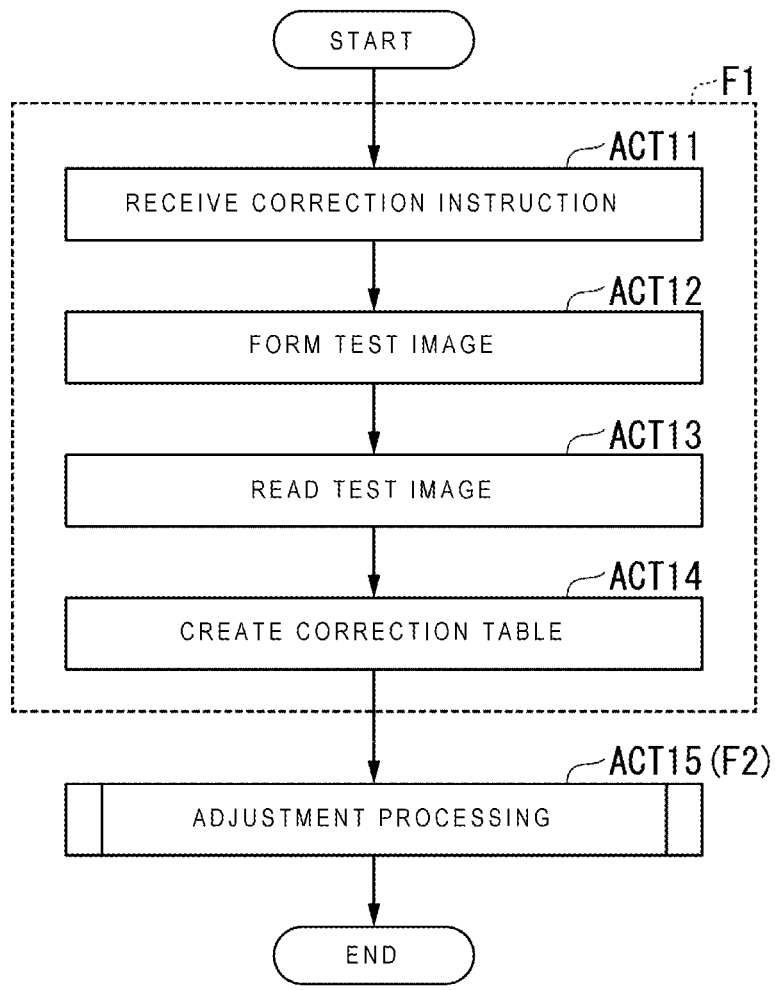
FIG. 3 is a flowchart for explaining an outline of correction table generation processing and correction table adjustment processing.

FIG. 3 is a flowchart for explaining an outline of the correction table generation processing and the correction table adjustment processing. The flowchart of FIG. 3 includes the correction table generation processing (F1) and the correction table adjustment processing (F2).

First, the correction table generation processing (F1) will be described. The control panel 120 receives an instruction to correct in-plane unevenness in accordance with the user's operation or the like (ACT 11).

The test image generation unit 151 forms a test image for generating a correction table (ACT 12). Specifically, the test image generation unit 151 reads the test image data for generating the correction table from the test image storage unit 102 and outputs the read test image data to the printer unit 130. The printer unit 130 forms a test image for generating a correction table and discharges the test image to the outside of the apparatus. Hereinafter, the test image for generating the correction table is referred to as a test image for generation.

The image reading unit 200 reads a test image for generation and converts the read test image into image information such as RGB values (ACT 13). As a result, the image reading unit 200 detects the density of each coordinate of the test image for generation. The correction table generation unit 152 generates a correction table based on the reading result of the test image (ACT 14). Details of the correction table generation processing will be described later. The correction table generation unit 152 stores the generated correction table in the correction table storage unit 103.

Figure 4:
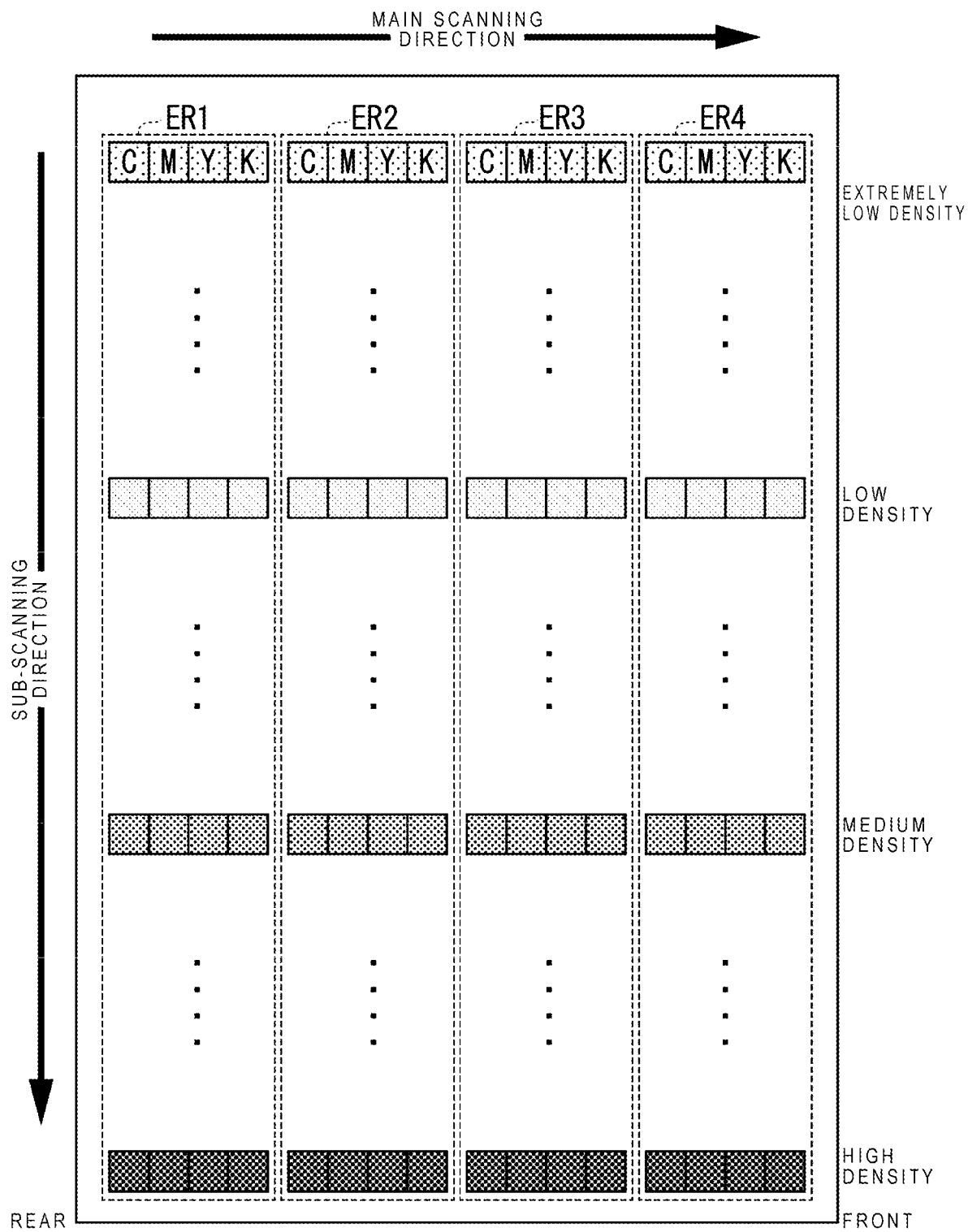
FIG. 4 is a view showing an example of a test image for generation.
Figure 5:
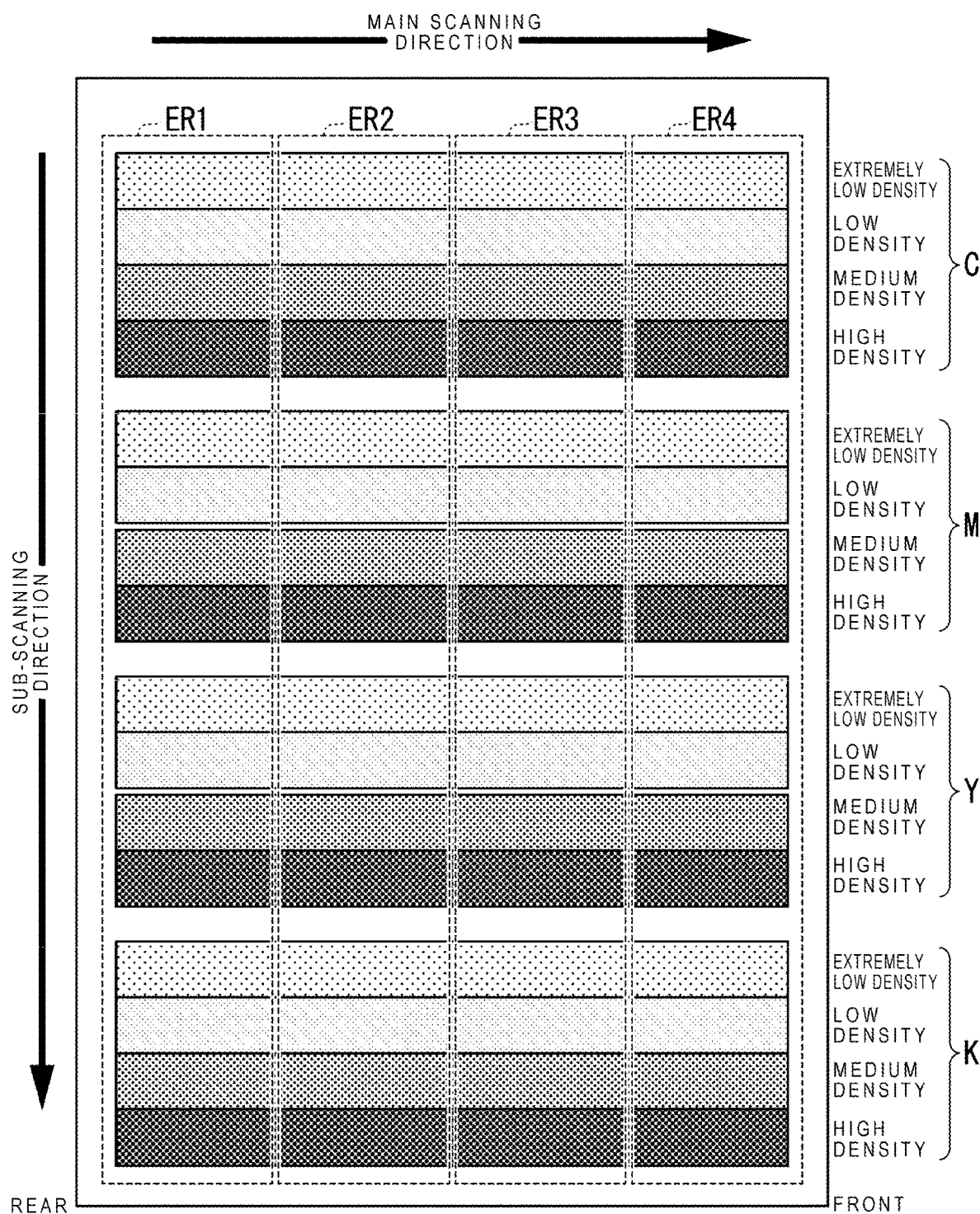
FIG. 5 is a view showing another example of the test image for generation.

Here, an example of the test image for generation is described according to FIGS. 4 and 5.

FIG. 4 is a view showing an example of the test image for generation. In FIG. 4, the horizontal direction indicates the main scanning direct ion and the vertical direction indicates a sub-scanning direction. In the example of FIG. 4, the left side shows a rear side and the right side shows a front side.

Correction of in-plane unevenness is correction for suppressing a difference (unevenness) in a density occurring in the main scanning direction of the sheet. Therefore, the test image has a plurality of partial areas ER1 to ER4 in the main scanning direction. Each of the partial areas ER1 to ER4 has an image formed based on the same gradation value among the plurality of partial areas ER1 to ER4. It is possible to verify the difference in a density occurring in the main scanning direction based on such a test image.

The density difference differs depending on, for example, a toner color (primary colors, CMYK). Therefore, each partial area ER has a plurality of primary color images. For example, each partial area ER has an image of each primary color formed based on a gradation value obtained by changing the value from "0" to "255" in the sub-scanning direction.

Hereinafter, when the partial areas ER1 to ER4 are not distinguished, the partial areas are also referred to as a partial area ER. The number of partial areas ER is not limited to four examples. At least one embodiment is described on the assumption that the number of partial areas ER is four.

FIG. 5 is a view showing another example of the test image for generation. In the test image for generation shown in FIG. 5, the direction in which each image of a plurality of primary colors is disposed is different with respect to the test image for generation shown in FIG. 4. Specifically, in the test image shown in FIG. 4, images of the plurality of primary colors are disposed along the main scanning direction. In contrast, in the test image shown in FIG. 5, images of the plurality of primary colors are disposed along the sub-scanning direction. In this manner, each of the plurality of primary color images may be disposed in any direction.

Hereinafter, the density range in which the gradation value is close to the value "0" is referred to as an "extremely low density" range. In addition, the density range in which the gradation value is close to the value "255" is referred to as a "high density" range. Further, the density range in which the gradation value is larger than the "extremely low density" range and smaller than the value "125" is referred to as a "low density" range. In addition, the density range in which the gradation value is larger than the value "125" and smaller than the "high density" range is referred to as a "medium density" range.

FIG. 6 is a view showing an example of a correction table generated by the processing ACT 14. The correction table shown in FIG. 6 shows a correct ion table of one color among the plurality of primary colors. The horizontal axis of the correction table shown in FIG. 6 shows an input value, and the vertical direction shows an output value. As described above, the input value and the output value are, for example, gradation values.

The correction table shown in FIG. 6 has correspondence relationships L1 to L4 between the input value and the output value for each of the partial areas ER1 to ER4. In the example of FIG. 6, the line L1 shows a correspondence relationship of the partial area ER1, and the line L2 shows a correspondence relationship of the partial area ER2. The line L3 shows a correspondence relationship of the partial area ER3, and the line L4 shows a correspondence relationship of the partial area ER4.

Here, generation of the correction table will be briefly described. Here, the image formed based on the image data having the gradation value "255" is referred to as a solid image. Generally, it is not easy for the printer unit 130 to control the density of the solid image more densely. Therefore, the correction table generation unit 152 generates a correction table based on the partial area ER having the lowest output density of the solid image among the plurality of partial areas ER. The correction table generation unit 152 creates a correction table so that the density characteristics of the other partial areas ER are close to the density characteristic of the partial area ER as a reference.

FIG. 6 exemplifies a case where the partial area ER having the lowest output density of the solid image among the plurality of partial areas ER1 to ER4 is the partial area ER4. The correction table generation unit 152 creates a correction table so that the density characteristics of the partial areas ER1 to ER3 are close to the density characteristic of the partial area ER 4. Therefore, the line L4 showing the correspondence relationship of the partial area ER4 indicates that the input value and the output value are equivalent. The lines L1 to L3 indicating the correspondence relationships of the partial areas ER1 to ER3 indicate that the output values are corrected to be smaller with respect to the input values in accordance with respective different degrees.

In this manner, the correction table has a correspondence relationship between the input value and the output value for each of the partial areas ER1 to ER4 (that is, according to the position in the main scanning direction). The density difference occurring in the main scanning direction is suppressed by correcting the gradation value of each pixel of the image data based on the correction table.

Returning to the flowchart of FIG. 3, the correction table adjustment processing (F2) will be described. After generating the correction table, the correction table generation unit 152 receives the correction table adjustment processing (ACT 15).

In the correction table adjustment processing, a service person or the user visually verifies the test image corrected based on the correction table. The service person or the user manually adjusts the correction table in accordance with the presence or absence of a density difference visually checked. Details of the correction table adjustment processing (ACT 15) will be described later in the flowchart of FIG. 9.

As described above, in the correction table adjustment processing, the service person or the user visually observes a density difference occurring in the test image and adjusts by manual input. For this reason, in the correction table adjustment processing according to the present embodiment, a test image different from the test image for generation is used. Hereinafter, the test image used in the adjustment processing is referred to as a test image for adjustment.

Figure 7:
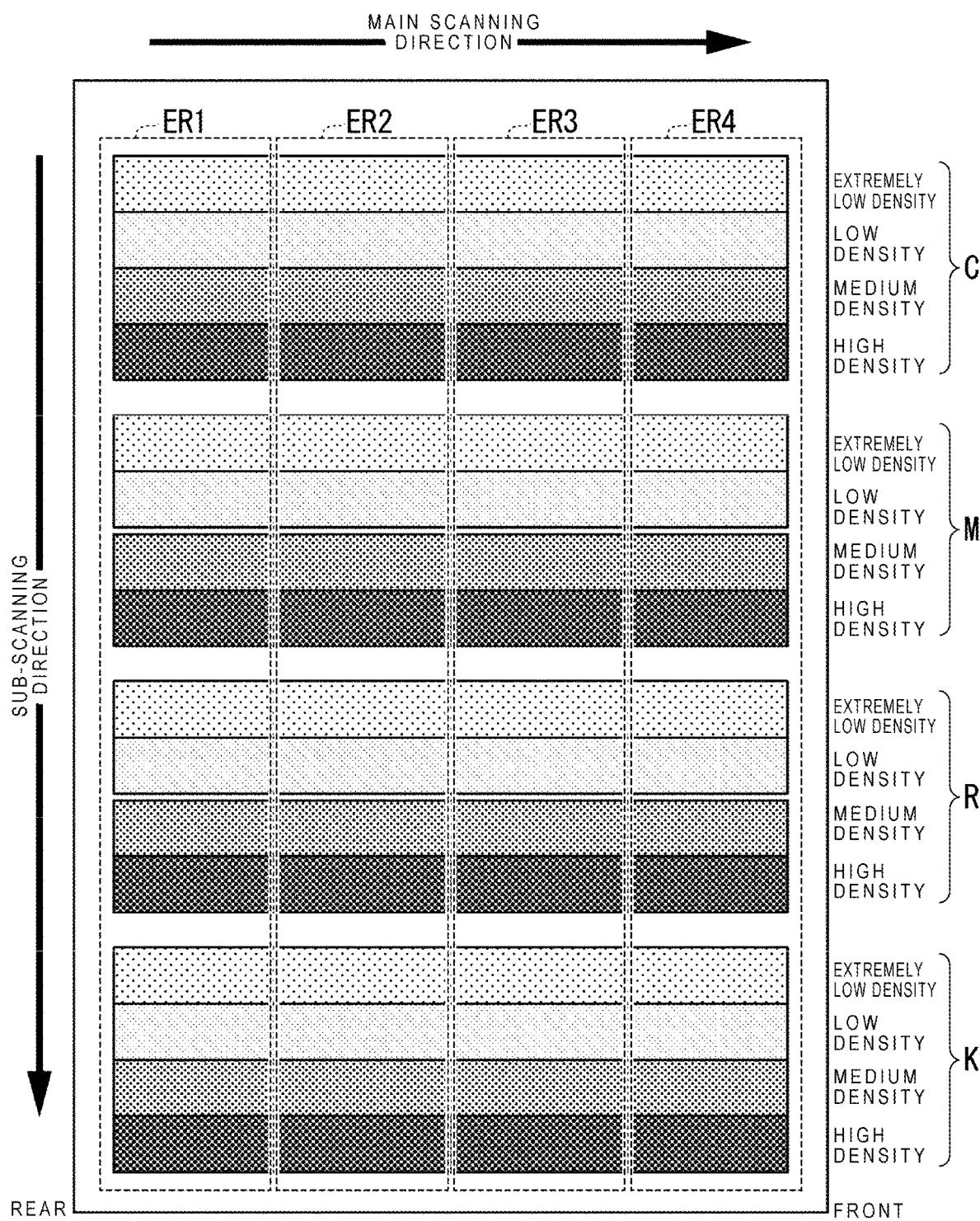
FIG. 7 is a view showing another example of a test image for adjustment.
Figure 8:
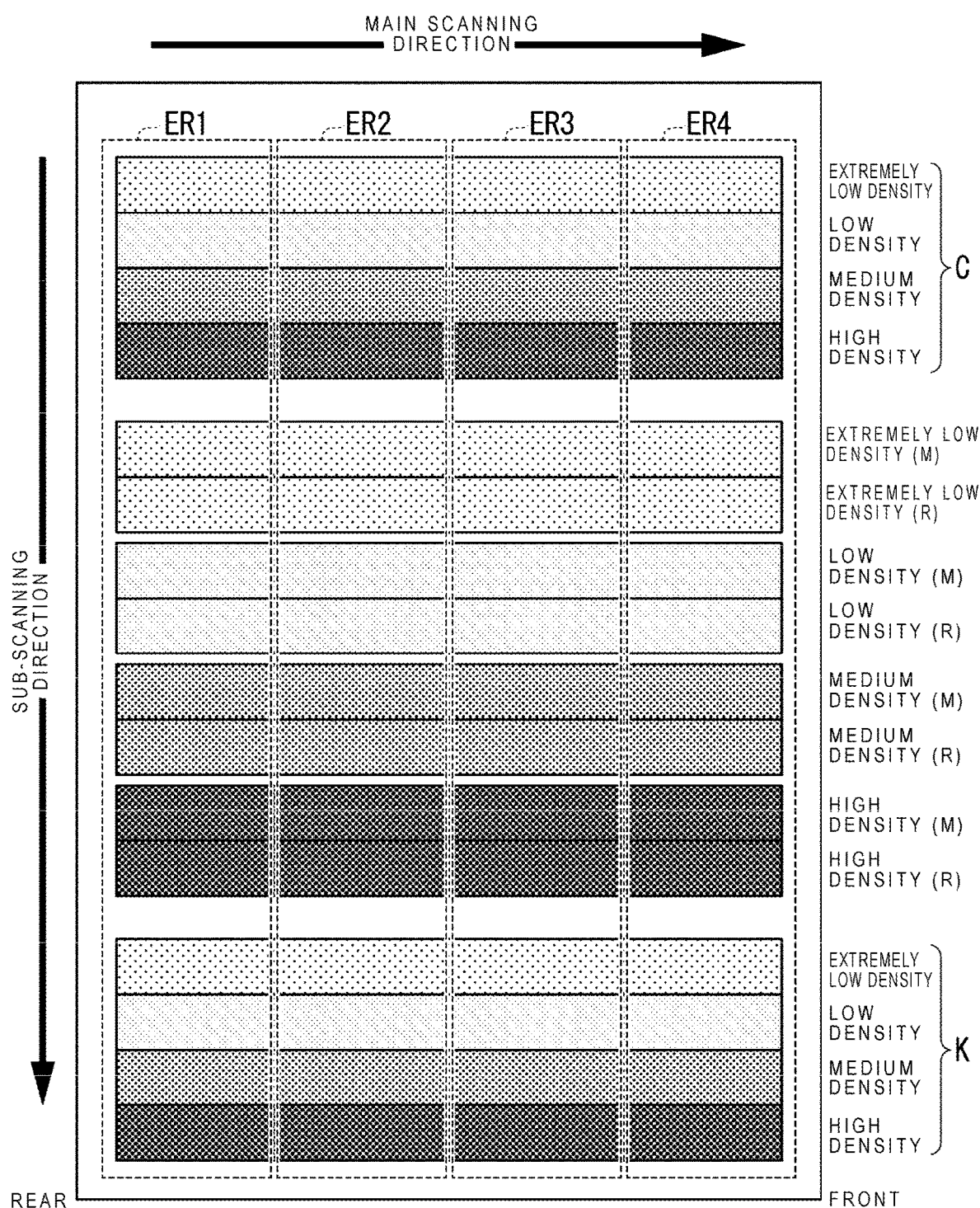
FIG. 8 is a view showing a modification example of the test image for adjustment.

Here, examples of a test image for adjustment are shown in FIGS. 7 and 8.

FIG. 7 is a view showing an example of a test image for adjustment. Similarly to the test image for generation, the test image for adjustment has an image formed based on the same gradation value in the main scanning direction. The test image for adjustment shown in FIG. 7 has a red image instead of a yellow image with respect to the test image for generation. Red is a secondary color in which magenta and yellow are mixed. In addition, the red image is disposed adjacent to a magenta image. In the example of the test image for adjustment shown in FIG. 7, the red image is disposed adjacent to the magenta image in the sub-scanning direction.

Depending on the primary color, it is not easy to visually detect the density difference. For example, it is not easy to visually verify a difference in the densities of luminance colors having high luminance. Therefore, the test image for adjustment has, for example, an image of a secondary color generated by mixing yellow with another primary color instead of a yellow image having high luminance.

Because another primary color is mixed in yellow, the user may easily detect the difference in a yellow density according to visual observation. In addition, as shown in FIG. 7, the red image is disposed adjacent to the magenta image mixed with yellow. That is, no image of another primary color is disposed between the red image and the magenta image. As a result, the user may compare the difference in the density of the red image with the difference in the density of the magenta image.

If the differences in the densities of both images are similar, the user may determine that the difference in the density of the red image is due to the difference in the density of the magenta image. In this case, the user adjusts the correction table of magenta. On the other hand, if the differences in densities between the images are different, the user detects the differences in densities between magenta and yellow based on the difference content. In this case, the user adjusts the correction tables of magenta and yellow, respectively.

Here, the red image of the test image for adjustment will be described. The red image is formed based on, for example, the gradation values of yellow and magenta which are uniformly changed in the sub-scanning direction. That is, the secondary color in the test image for adjustment has gradation values of the first primary color and the second primary color which are uniformly changed in the sub-scanning direction. For example, equivalent gradation values of yellow and magenta are mixed.

Specifically, a red image in the "low density" range shown in FIG. 7 is an image formed based on yellow of a low gradation value and magenta of a low gradation value. A red image in the "high density" range is an image formed based on yellow of a high gradation value and magenta of a high gradation value. The same applies to other density ranges.

As a result, the user may compare the magenta image and the red image formed based on the magenta gradation value changed together. As a result, it is possible to more easily verify whether or not the differences in the densities between the images are different.

In addition, the red image may be formed based on the gradation value of yellow changed in the sub-scanning direction and the gradation value of magenta constant in the sub-scanning direction. That is, the secondary color in the test image for adjustment may have the gradation value of the first primary color changed and the gradation value of the second primary color constant in the sub-scanning direction. For example, the gradually increasing gradation value of yellow and the constant gradation value of magenta are mixed.

The constant gradation value is, for example, a value smaller than the half value of the maximum value of the gradation value. The maximum value of the gradation value in the present embodiment is, for example, the value "255". In this case, the constant gradation value is, for example, a value smaller than the value "127.5". The constant gradation value in at least one embodiment is, for example, the gradation value "50".

Specifically, the red image in the "low density" range is an image formed based on yellow of a low gradation value and magenta of the gradation value "50". The red image in the "high density" range is an image formed based on yellow of a high gradation value and magenta of the gradation value "50".

As a result, the user may verify based on a red image having uniform color tone of magenta while maintaining the change of the gradation value of yellow. That is, the user may verify the presence or absence of a difference in the density of yellow based on the gradation of yellow generated in the red image.

In the example of FIG. 7, magenta is exemplified as a primary color that is mixed with yellow, but exemplary embodiments are not limited to this example. The test image for adjustment may have an image of green (secondary color) in which yellow and cyan are mixed instead of the yellow image.

In addition, in the example of FIG. 7, a case where yellow and other primary colors are mixed is exemplified, but the exemplary embodiments are not limited to this example. Yellow is an example. Primary colors which are difficult to visually detect a density difference differ depending on the test environment and users. For example, the test image for adjustment may have a blue image in which cyan and magenta are mixed, adjacent to the cyan image.

FIG. 8 is a view showing a modified example of the test image for adjustment. In the test image for adjustment shown in FIG. 8, magenta and red images are disposed adjacent for each density range. Specifically, the magenta and red images in the "extremely low density" range are disposed adjacent to each other. Likewise, magenta and red images in the "low density" range are disposed adjacent to each other. The same applies to other density ranges.

In this manner, for each density range, an image of the secondary color (red) may be disposed adjacent to an image of the primary color (magenta). The user may compare the densities of both images for each density range. As a result, it is possible to properly verify the difference in a density for each density range.

In the examples of FIGS. 7 and 8, a case where the test image for adjustment has an image of a secondary color obtained by mixing two kinds of primary colors is exemplified. However, embodiments are not limited to this example. The test image for adjustment may have an image obtained by mixing different primary colors in addition to the two kinds of primary colors. In this case as well, it is easy to visually verify the difference in the density of the primary color by mixing one or two other primary colors with a primary color to be verified.

Figure 9:
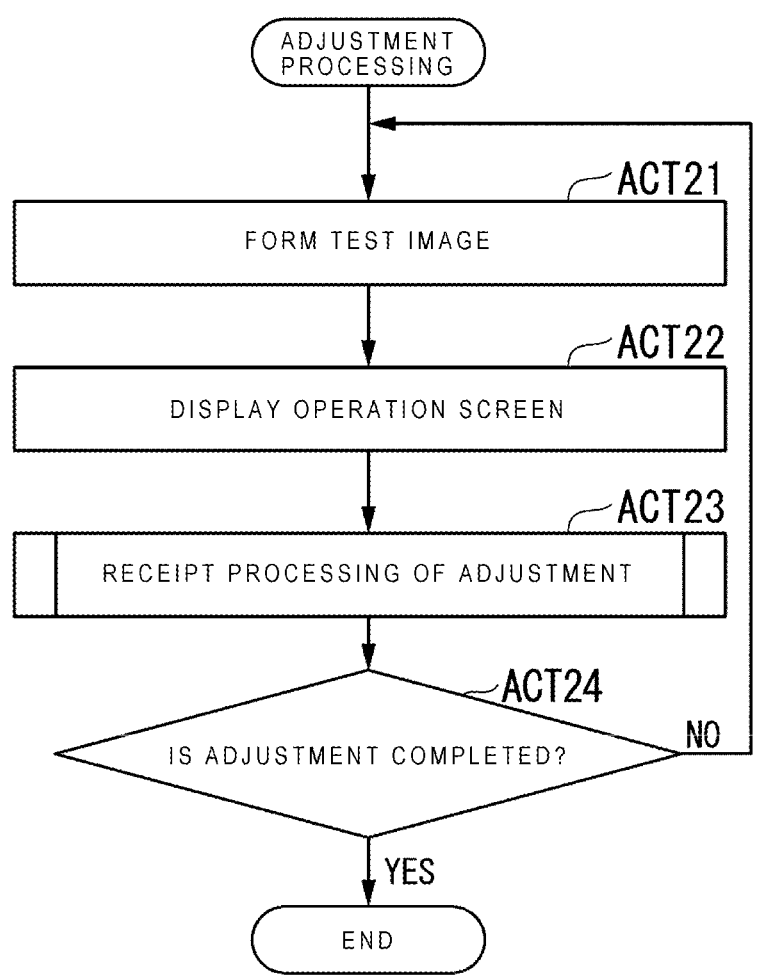
FIG. 9 is a flowchart for explaining a flow of the correction table adjustment processing (ACT 15 in FIG. 3) using the test image for adjustment.

The correction table adjustment processing using the test image for adjustment exemplified in FIGS. 7 and 8 is described in the flowchart of FIG. 9.

FIG. 9 is a flowchart for explaining the flow of the correction table adjustment processing (ACT 15 in FIG. 3).

The test image generation unit 151 forms a test image for adjustment (FIGS. 7 and 8) based on the correction table created in the processing ACT 14 (ACT 21).

Specifically, the test image generation unit 151 reads the test image for adjustment data from the test image storage unit 102. Based on the created correction table, the test image generation unit 151 corrects the gradation value that the test image for adjustment data has for each pixel. The test image generation unit 151 outputs the corrected test image for adjustment data to the printer unit 130. The printer unit 130 forms a test image for adjustment to discharge the test image to the outside of the apparatus.

The user visually observes the discharged test image for adjustment and verifies the difference in density of each primary color. The correction table generation unit 152 displays an operation screen on the control panel 120 (ACT 22). The operation screen is a screen for receiving adjustment of the correction table. Details of the operation screen will be described later in FIG. 10.

The correction table generation unit 152 receives adjustment of the correction table of each primary color via the operation screen (ACT 23). Details of receipt processing of the adjustment of the correction table (ACT 23) will be described later in the flowchart of FIG. 11.

The correction table generation unit 152 determines whether or not adjustment of the correction table is completed (ACT 24). When the adjustment is completed (ACT 24: YES), the correction table generation unit 152 ends the processing. On the other hand, when it is determined that the adjustment is not completed (ACT 24: NO), the processing returns to the processing ACT 21 and a test image for adjustment is formed again.

Figure 10:
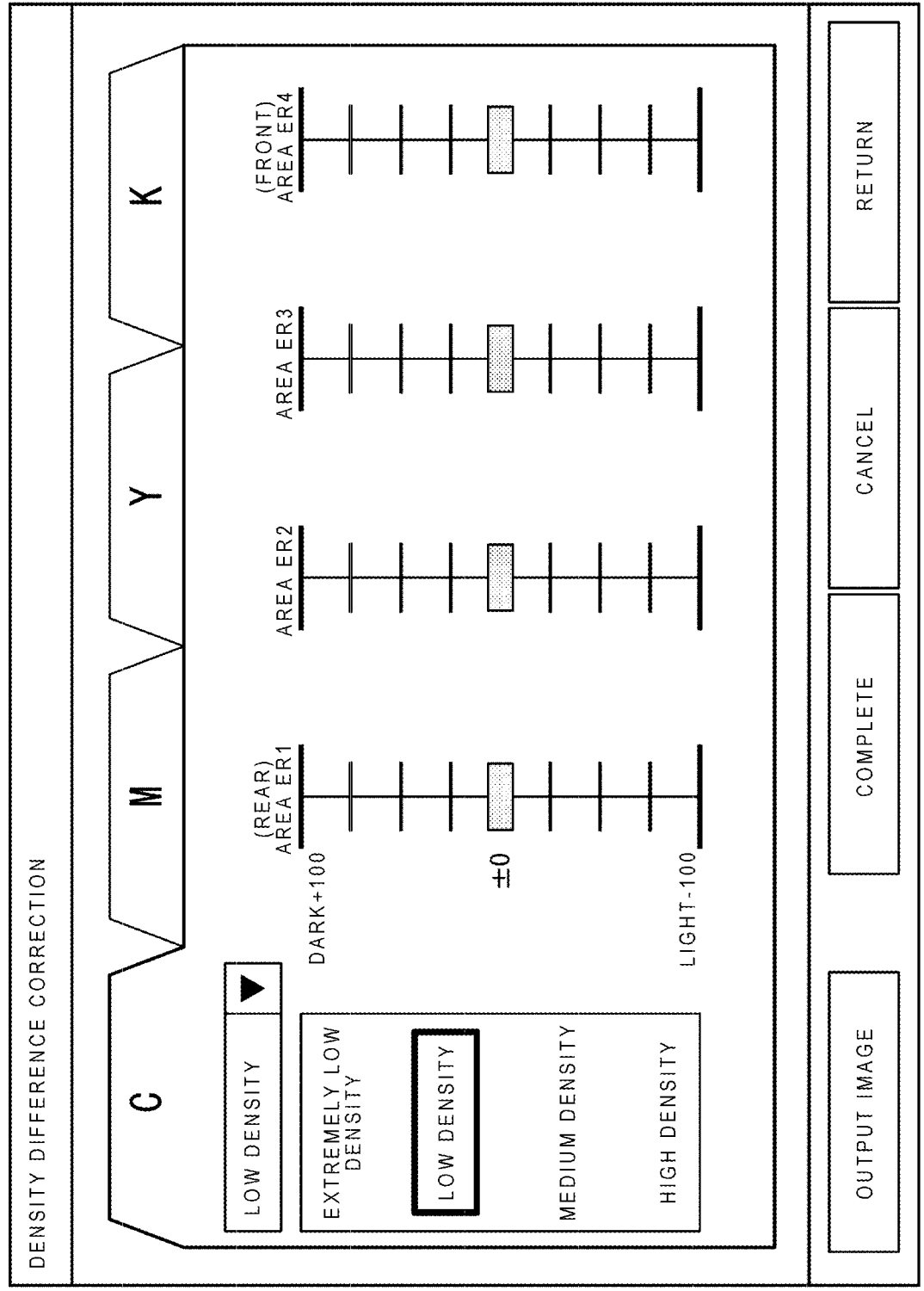
FIG. 10 is a view showing an example of an operation screen displayed on a control panel.

FIG. 10 is a view showing an example of the operation screen displayed on the control panel 120. As shown in FIG. 10, the operation screen has tabs of each primary color. On the operation screen of FIG. 10, a cyan tab is selected.

The operation screen receives a density change for each partial area ER for each density range. In FIG. 10, the "low density" range is selected. In this case, the user may adjust the density (correction table) of each partial area ER1 to ER4 in the "low density" range of cyan by operating a scale up and down.

Figure 11:
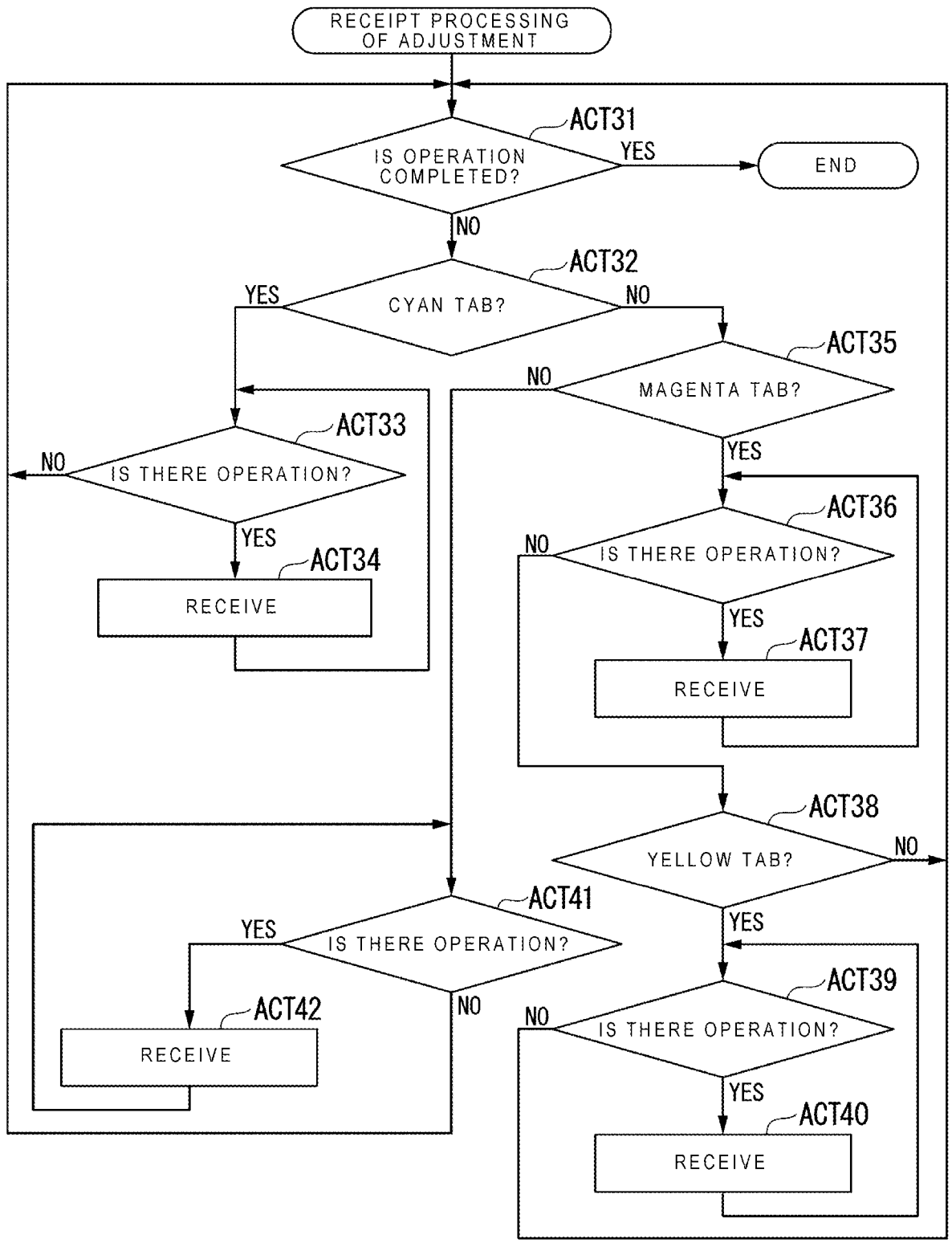
FIG. 11 is a flowchart for explaining a flow of receipt processing (ACT 23) for adjustment of the correction table.

FIG. 11 is a flowchart for explaining the flow of receipt processing (ACT 23) for adjustment of the correction table. The user verifies the test image for adjustment (FIGS. 7 and 8) and operates the operation screen (FIG. 10).

The correction table generation unit 152 determines whether or not the operation by the user is completed (ACT 31). When the operation is completed (ACT 31: YES), the correction table generation unit 152 ends the processing.

When the operation is not completed (ACT 31: NO), the correction table generation unit 152 determines whether or not the cyan tab is selected (ACT 32). When the cyan tab is selected (ACT 32: YES), the correction table generation unit 152 receives the adjustment operation of the correction table of cyan. While the operation is being performed (ACT 33: YES), the correction table generation unit 152 receives the adjustment (ACT 34). When the operation is completed, the correction table generation unit 152 returns to the processing ACT 31.

If the cyan tab is not selected (ACT 32: NO), the correction table generation unit 152 determines whether or not a magenta tab is selected (ACT 35). When the magenta tab is selected (ACT 35: YES), the correction table generation unit 152 receives the adjustment operation of the correction table of magenta. While the operation is being performed (ACT 36: YES), the correction table generation unit 152 receives the adjustment (ACT 37).

When adjustment of the correction table of magenta is completed, the correction table generation unit 152 performs the following determination. That is, the correction table generation unit 152 determines whether or not a yellow tab is selected (ACT 38).

When the yellow tab is selected (ACT 38: YES), the correction table generation unit 152 receives the adjustment operation of the correction table of yellow. While the operation is being performed (ACT 39: YES), the correction table generation unit 152 receives the adjustment (ACT 40). When the operation is completed, the correction table generation unit 152 returns to the processing ACT 31.

In this manner, while the adjustment of the correction table of magenta is not being completed, the correction table generation unit 152 does not permit adjustment of the correction table of yellow. In other words, the correction table generation unit 152 receives a change of the correction table of the second primary color, and then receives a change of the correction table of the first primary color. As a result, the user may adjust the correction table of each primary color according to an appropriate order.

For example, after completing the adjustment of the correction table of magenta, the user instructs formation of a test image based on the adjusted correction table. In this case, the user may adjust the correction table of yellow based on the test image for adjustment in which the difference in the density of magenta is corrected.

If the magenta tab is not pressed (ACT 35: NO), the correction table generation unit 152 receives the adjustment operation of the correction table of black. While the operation is being performed (ACT41: YES), the correction table generation unit 152 receives the adjustment (ACT 42). When the operation is completed, the correction table generation unit 152 returns to the processing ACT 31.

In this manner, the correction table generation unit 152 adjusts the correction table of each primary color based on the test image for adjustment. That is, the correction table generation unit 152 adjusts the correction table according to the test result based on the test image for adjustment. It is possible to correct the correction table appropriately based on the test result of the test image for adjustment which is considered to be visually verified. That is, it is possible to adjust the correction table so that the density difference in the main scanning direction is suppressed, or the density difference is controlled to a desired state.

According to at least one embodiment described above, the image forming apparatus includes the image forming unit and the control unit. The image forming unit forms a test image (test image for adjustment) based on test image data (test image data). The test image data includes a first image area and a second image area. In the test image data, the first image area is disposed adjacent to the second image area. The first image area is an image area including a mixed color image of the first primary color and the second primary color and has the same gradation value in the main scanning direction. The second image area is an image area of the second primary color and has the same gradation value in the main scanning direction.

The control unit corrects the correction table based on the test image formed in the image forming unit. In the correction table, for each primary color, the gradation value is corrected according to a position in the main scanning direction. As a result, it is possible to easily verify the difference in the density of the first primary color by the user when visually verifying the difference in the density of each primary color.

In addition, the first image area is disposed adjacent to the second image area. As a result, the user may appropriately compare the image of the secondary color with the image of the second primary color. Therefore, the user may verify the difference between the densities of the first primary color and the second primary color with high accuracy.

In this manner, the image forming apparatus 100 forms a test image for adjustment to visually verify the difference in the density of each primary color with high accuracy. As a result, it is possible to appropriately adjust the correction table of each primary color. The image forming apparatus 100 corrects the gradation value of each image data to be subjected to image formation based on the correction table appropriately adjusted. Therefore, the image forming apparatus 100 may correct the gradation value of each primary color of each image data so that no density difference occurs in the main scanning direction. As a result, unevenness occurring in the surface may be more effectively suppressed, and the image quality is improved. The first primary color is, for example, yellow with high luminance, and the second primary color is, for example, magenta or cyan.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
an image forming unit configured to form a test image based on test image data including a first image area and a second image area, the first image area being an image area including a mixed color image of a first primary color and a second primary color, the first image area having a same gradation value in a main scanning direction, the second image area being an image area of the second primary color and having a same gradation value in the main scanning direction, the first image area being disposed adjacent to the second image area; and
a controller configured to correct a correction table for correcting the gradation value according to a position in the main scanning direction for each of the primary colors based on the test image.

2. The apparatus according to claim 1, wherein the mixed color image has gradation values of the first primary color and the second primary color changed in a sub-scanning direction.

3. The apparatus according to claim 2, wherein the first image area and the second image area are divided into a plurality of density ranges, and the first image area is disposed adjacent to the second image area for each of the density ranges.

4. The apparatus according to claim 1, wherein a color of the mixed color image has a gradation value of the first primary color changed in a sub-scanning direction and a gradation value of the second primary color constant in the sub-scanning direction.

5. The apparatus according to claim 4, wherein a gradation value of the constant second primary color is smaller than a half value of a maximum gradation value.

6. The apparatus according to claim 1, wherein an image area of a primary color other than the first primary color and the second primary color is not disposed between the first image area and the second image area.

7. The apparatus according to claim 1, wherein the first primary color is yellow and the second primary color is magenta or cyan.

8. The apparatus according to claim 1, wherein the controller is configured to receive a change in the correction table accepting a change in the correction table of the first primary color after accepting a change in the correction table of the second primary color.

9. A non-transitory computer-readable storage medium configured to store therein a program executable by a processor to perform operations comprising:
causing an image forming apparatus to receive an instruction to form a test image for correcting of a correction table by correcting a gradation value of image data according to a position in a main scanning direction for at least one primary color, and
causing the image forming apparatus to form the test image, the test image corresponding to test image data that includes:
a first image area which is an image area including a mixed color image of a first primary color and a second primary color and has a same gradation value in the main scanning direction, the gradation value being associated with a density range, and
a second image area which is an image area of the second primary color and has a same gradation value in the main scanning direction, the gradation value of the second image area being the same as the gradation value of the first image area and being associated with the same density range as the gradation value of the first image area,
wherein the first image area is disposed adjacent to the second image area, and wherein the first image area and the second image area are disposed at different positions in a sub-scanning direction orthogonal to the main scanning direction.

10. The non-transitory computer-readable storage medium according to claim 9,
wherein the mixed color image has gradation values of the first primary color and the second primary color changed in the sub-scanning direction.

11. The non-transitory computer-readable storage medium according to claim 10,
wherein the first image area and the second image area are divided into a plurality of density ranges, and
the first image area is disposed adjacent to the second image area for each of the density ranges.

12. The non-transitory computer-readable storage medium according to claim 9,
wherein a color of the mixed color image has a gradation value of the first primary color changed in a sub-scanning direction and a gradation value of the second primary color constant in the sub-scanning direction.

13. The non-transitory computer-readable storage medium according to claim 12,
wherein a gradation value of the constant second primary color is smaller than a half value of a maximum gradation value.

14. The non-transitory computer-readable storage medium according to claim 9,
wherein the first primary color is yellow and the second primary color is magenta or cyan.

15. An output density adjustment method of an image forming apparatus, the method comprising:
forming a test image based on test image data that includes a first image area and a second image area, the first image area being an image area including a mixed color image of a first primary color and a second primary color, the first image area having a same gradation value in a main scanning direction, the second image area being an image area of the second primary color and having a same gradation value in the main scanning direction, the first image area being disposed adjacent to the second image area; and
correcting a correction table for correcting the gradation value according to a position in the main scanning direction for each of the primary colors based on the test image.

16. The method according to claim 15,
wherein the mixed color image has gradation values of the first primary color and the second primary color changed in a sub-scanning direction.

17. The method according to claim 16, further comprising:
dividing the first image area and the second image area into a plurality of density ranges, and
disposing the first image area adjacent to the second image area for each of the density ranges.

18. The method according to claim 15,
wherein a color of the mixed color image has a gradation value of the first primary color changed in a sub-scanning direction and a gradation value of the second primary color constant in the sub-scanning direction.

19. The method according to claim 18,
wherein a gradation value of the constant second primary color is smaller than a half value of a maximum gradation value.

20. The method according to claim 15,
wherein the first primary color is yellow and the second primary color is magenta or cyan.

* * * * *